United States Patent
Pagnella

(10) Patent No.: US 6,738,566 B2
(45) Date of Patent: May 18, 2004

(54) INSULATED HOSE FOR TRANSMITTING HOT LIQUIDS

(75) Inventor: Patrick C. Pagnella, Monterey, CA (US)

(73) Assignee: Nordson Corporation, Westlake, OH (US)

( * ) Notice: Subject to any disclaimer, the term of this patent is extended or adjusted under 35 U.S.C. 154(b) by 360 days.

(21) Appl. No.: 09/898,782

(22) Filed: Jul. 3, 2001

(65) Prior Publication Data

US 2003/0007789 A1 Jan. 9, 2003

(51) Int. Cl.⁷ .................................................. F24H 1/08
(52) U.S. Cl. ........................ 392/472; 392/473; 392/476; 219/534
(58) Field of Search ................................ 392/472, 473, 392/476, 465, 466, 468, 478, 479, 480; 219/534, 536

(56) References Cited

U.S. PATENT DOCUMENTS

| 4,323,174 A | * | 4/1982 | Wood | 222/146.2 |
| 4,455,474 A | | 6/1984 | Jameson et al. | 219/301 |

* cited by examiner

*Primary Examiner*—Thor Campbell
(74) *Attorney, Agent, or Firm*—Wood, Herron & Evans, L.L.P.

(57) ABSTRACT

A hose for carrying liquid, such as hot met adhesive, within a predetermined elevated temperature range. The hose includes a tube for carrying liquid therethrough. The tube is encased in a reinforcing layer with an outer surface. A heater wire, which has an inner core encased in a protective casing, is wound around the reinforcing layer such that the protective casing is in direct contact with the outer surface of the reinforcing layer. Preferably, the protective casing is made from polytetraflouroethylene (PTFE). A thermal insulation layer is disposed around the heater wire and the reinforcing layer to act as a barrier to heat loss from the hose.

13 Claims, 2 Drawing Sheets

INSULATED HOSE FOR TRANSMITTING HOT LIQUIDS

FIELD OF THE INVENTION

The present invention generally relates to hoses for carrying heated liquids, such as hot melt adhesives.

BACKGROUND OF THE INVENTION

Various processes involve the transmission of a heated liquid a liquid dispensing device to a desired location such as onto a substrate. For example, hot melt adhesives are frequently applied to products and product packaging. Generally, the hot melt adhesives are applied by a dispensing gun which is connected via a hose to a supply tank. Hot melt adhesives are generally solid at room temperature and, accordingly, must be heated prior to their application so that they can flow from the supply tank, through the hose, and to the dispensing gun. To melt and subsequently maintain the hot melt adhesive at the appropriate temperature, components such as the supply tank, the hose, and the dispensing gun are selectively heated by individual heating devices associated with each component. To monitor the temperature of the hot melt adhesive throughout the application process, each component further includes some form of temperature sensing device which is associated with at least one of the heating devices. A controller operates the heating device in response to signals from the temperature sensing device to maintain the hot melt adhesive within a predetermined temperature range.

In heated hoses such as the one disclosed in U.S. Pat. No. 4,455,474, the inner tube of the hose is typically made from a polymeric material such as polytetraflouroethylene (PTFE) or Teflon® because of its ability to withstand the relatively high temperatures of the hot melt adhesive pumped through the hose. U.S. Pat. No. 4,455,474 is assigned to Nordson Corporation, Westlake, Ohio, the same assignee as the present invention and its disclosure is hereby incorporated fully herein by reference. As PTFE will not withstand the relatively high pressures at which the hot melt adhesive is pumped, i.e., on the order of 200 psi, the PTFE tube is typically encased within a stainless steel braiding. The stainless steel braiding generally has a relatively rough outer surface. Thus, any component wound around and directly contacting the stainless steel braiding may experience abrasion as the entire hose flexes and the wound component moves relative to the stainless steel braiding.

To minimize the risk of abrasion by the stainless steel braiding, the stainless steel braiding is wrapped with at least two layers of a protective tape, such as silicon tape. The silicon tape provides a relatively smooth surface over which other operative elements of the hose, such as heating and temperature sensing devices, can be wrapped without experiencing appreciable abrasion. For example, the heating device is often an electrical resistance heater comprised of two or more bare electrically conductive resistance heating wires collectively wrapped by a layer of tape, such as Kapton® tape. The Kapton® tape serves primarily to consolidate the individual bare wires into a unitary group and this unitary group is then wrapped around the layers of silicon tape. In this instance, the silicon tape over the stainless steel braiding is essential because the Kapton® tape is not abrasion resistant. Without the protective layer of silicon tape, the stainless steel braiding would quickly abrade the Kapton® tape, allowing the bare wires to contact the stainless steel braiding and causing the electrical resistance heater to short out. Unfortunately, once the heating device shorts out, replacement of the entire hose is generally necessary.

Using a protective tape between the stainless steel braiding and the heating device has several drawbacks. One drawback is the expense and time required to place the protective tape over the stainless steel braiding. Another drawback is that the protective tape acts as a thermal insulation layer between the heating device and the hot melt adhesive. Furthermore, the addition of the protective layers increases the diameter of the hose and may affect its flexibility.

In light of the drawbacks discussed above, it would be desirable to provide a heated hose that includes an protective cover or casing that is not susceptible to abrasion when placed in contact with a reinforcing layer such as a stainless steel braided cover. Advantageously, the normally present protective tape should be eliminated resulting in reduced manufacturing costs and energy requirements.

SUMMARY OF THE INVENTION

The present invention is directed to a hose which overcomes the drawbacks associated with previous hoses connecting supply tanks to adhesive dispensing guns. In the preferred embodiment, the hose includes a tube for carrying liquid therethrough. Preferably, the tube is made from polytetraflouroethylene. The tube is encased in a reinforcing layer which has an outer surface. Preferably, the reinforcing layer is a metallic braided cover and more preferably a stainless steel braided cover. A heater wire, which has an inner core contacted in surrounding relation by a protective casing, is wound around the reinforcing layer such that the protective casing is in direct contact with the outer surface of the reinforcing layer.

Preferably, the protective casing is made from one or more abrasion resistant materials including self-lubricating polymers such as polytetraflouroethylene (PTFE), polyamides, polyethene, and ultrahigh-molecular-weight polyethylene (UHWMPE) and/or non-self-lubricating polymers such as acetals. A thermal insulation layer is disposed around the heater wire and the reinforcing layer to act as a barrier to heat loss from the hose.

Various additional advantages, objects and features of the invention will become more readily apparent to those of ordinary skill in the art upon consideration of the following detailed description of the presently preferred embodiments taken in conjunction with the accompanying drawings.

DETAILED DESCRIPTION OF DRAWINGS

DETAILED DESCRIPTION OF PREFERRED EMBODIMENTS

Figure 1:
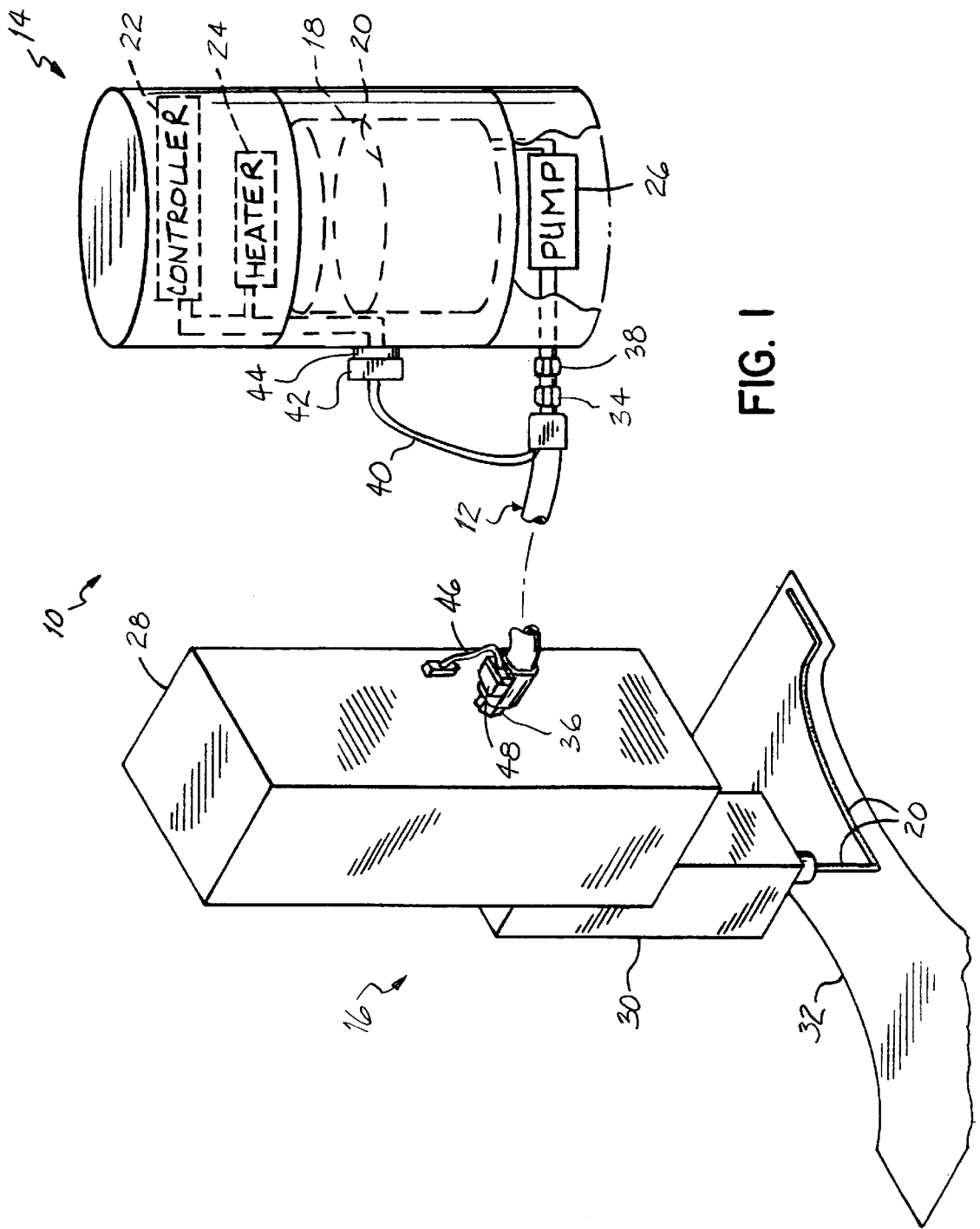
FIG. 1 is a diagrammatic perspective view of the hose of the present invention connecting a supply tank to a dispensing gun.

With reference to FIG. 1, an adhesive dispensing system 10 includes a hose 12 constructed in accordance with the principals of the present invention. The adhesive dispensing system further includes a melt unit, sometimes also referred to as an applicator, as shown schematically at 14 and a dispensing unit 16 with hose 12 connected therebetween. The melt unit 14 includes a reservoir or supply tank 18 which holds a thermoplastic material, such as a hot melt adhesive 20. The melt unit 14 also incorporates a controller 22, heaters 24 for melting and liquifying the adhesive 20, and a pump 26 which is coupled to the supply tank 18 for pumping the liquified adhesive 20 from the supply tank 18. A typical melt unit 14 would include any number of those manufactured by Slautterback Corporation or by Nordson Corporation, such as for example, the Nordson® 3000 series applicators. In addition, hose 12 of this invention may be used with other types of melting or liquifying apparatus, including premelters, drum and pail melters, etc.

The dispensing unit 16 may include a manifold or service block 28 coupled to an adhesive dispensing gun 30. The adhesive dispensing gun 30 selectively dispenses adhesive 20 onto a substrate 32 such as, for example, a nonwoven web used in the construction of a diaper or the flaps of a box or carton for sealing the flaps closed. Alternatively, a heated hand gun may be used to dispense the hot melt adhesive 20 onto the substrate 32.

Pump 26 is selectively controlled to pump adhesive 20 from supply tank 18, through hose 12 and to adhesive dispensing gun 30. Controller 22 monitors the temperature of adhesive 20 in the supply tank 18, the hose 12, and the manifold 28 and selectively controls heater 24 to maintain the adhesive 20 in the supply tank 18, the hose 12, and the manifold 28 within a predetermined temperature range.

The hose 12 has an inlet end 34 and a discharge end 36. The inlet end is coupled to the melt unit 14 and more specifically to a discharge outlet 38 which is coupled to pump 26. Discharge end 36 of hose 12 may be coupled directly to manifold 28. A wire harness 40, which extends generally from inlet end 34, has a connector 42 which couples to a connector 44 of melt unit 14. Connector 44 is operatively connected to controller 22 for providing electrical power and/or control. A selectively detachable cable 46 is connected between a connector 48 associated with discharge end 36 and manifold 28. As will be discussed in greater detail below, cable 46 serves to operatively connect controller 22 and heater 24 to manifold 28.

Figure 2:
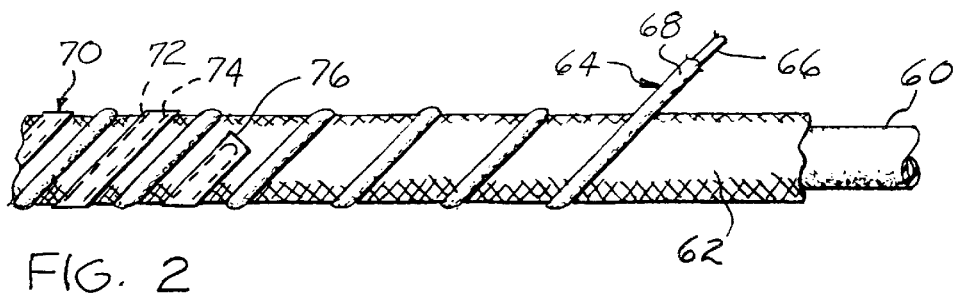
FIG. 2 is a side elevational view of one section of the hose of FIG. 1 illustrating a portion of the wrapping sequence during the manufacture of the hose.

Hose 12 is comprised of several different layers and components. A section of hose 12 is shown in FIG. 2 in the initial stages of assembly. A tube 60 forms the operative core of the hose 12 through which the adhesive 20 actually flows at a pressure of up to several hundred psi. Tube 60 is preferably made from a material capable of withstanding relatively high temperatures such as polytetraflouroethylene (PTFE). Because tube 60 is made from PTFE, it is unable to withstand high fluid pressure. Accordingly, tube 60 must be reinforced by a reinforcing layer, such as encasing it from end to end in a braided cover 62. Braided cover 62 should be made from high strength material to provide tube 60 with sufficient strength to resist the high fluid pressure as well as to provide flexibility. Preferably, the braided cover 62 is made from stainless steel. Because of its braided construction, braided cover 62 has a generally rough outer surface, especially compared to the smooth outer surface of tube 60.

Hot melt adhesive is generally a solid at room temperature. Furthermore, the viscosity of hot melt adhesive is temperature dependent. If the adhesive is allowed to cool below a critical flow temperature, the adhesive will not flow or dispense properly and may ultimately solidify and/or clog the adhesive dispensing system 10. To counter this, a heater wire 64 is helically wound directly over the outside surface of the stainless steel braided cover 62. The heater wire 64 and the number of wraps per unit length are selectively operative to maintain the adhesive within a predetermined temperature range in order that the adhesive flows and dispenses properly.

Heater wire 64 of the present invention is comprised of an electrically conductive core 66 encased in a protective casing or coating 68. The conductive core 66 may be a single strand or solid core, or it may be comprised of a number of strands. The conductive core 66 illustrated in FIG. 2 has only one strand encased in protective casing 68. If additional strands or filaments are utilized to comprise conductive core 66, they may be encased or encapsulated by a single protective casing 68. Alternatively, multiple single core wires 64 may be wrapped around cover 62. In accordance with the principles of the present invention, the protective casing 68 is constructed from material which is highly resistant to abrasion. Abrasion resistant materials suited for use as the protective cover 68 for heater wire 64 include self-lubricating polymers such as polytetraflouroethylene (PTFE), polyamides, polyethene, and ultrahigh-molecular-weight polyethylene (UHWMPE) and non-self-lubricating polymers such as acetals. Other polymers filled with PTFE, graphite or molybdenum disulfide ($MoS_2$) may also be used. The preferred manner of manufacturing the heater wire 64 is by extruding casing 68 in surrounding relation to core 66 or otherwise coating core 66 with casing 68.

Because the protective casing 68 is abrasion resistant, the heater wire 64 can be wrapped directly over the outer surface of steel braided cover 62 without the need for the usually intervening protective layer. During assembly of hose 12, the heater wire 64 is wrapped from the inlet end 34 to the discharge end 36 and then wrapped back towards the inlet end 34. As a result, heater wire 64 has two leads which exit the hose 12 around inlet end 34, traverse wire harness 40 and connect to connector 42. Tape (not shown) may be used to hold the heater wire 64 in place as it is wrapped around the steel braided cover 62. As such, heater wire 64 is operatively connected to controller 24.

A temperature sensing device 70 is also helically wound in direct contact with steel braided cover 62. The temperature sensing device 70 measures the temperature of the adhesive flowing through the tube 60. The temperature sensing device 70 could be a resistance temperature device (RTD), a thermocouple, or any other suitable temperature sensing device for measuring temperature. The temperature sensing device illustrated in FIG. 2 is an RTD with first and second RTD leads 72, 74 shown as dashed lines. To facilitate assembly, a layer of tape 76 is used to secure the RTD leads 72, 74 to the steel braided cover 62. Temperature sensing device 70 measures the temperature of the adhesive along a discrete portion of the hose 12 generally near the discharge end 36 of hose 12. Like the two leads of the heater wire 64, first and second RTD leads 72, 74 exit the hose 12 around inlet end 34, traverse wire harness 40 and connect to connector 42. As such, temperature sensing device 70 is operatively coupled to controller 22.

Figure 3:
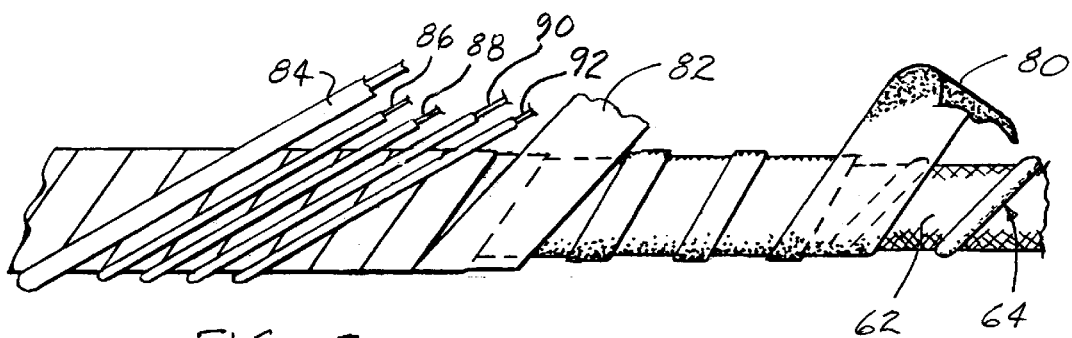
FIG. 3 is a side elevational view of another section of the hose of FIG. 1 illustrating a further portion of the wrapping sequence during the manufacture of the hose.

With reference to FIG. 3, hose 12 is shown in a more advanced stage of assembly relative to FIG. 2. A single layer of double stick tape 80 is wrapped around the heater wire 64, the temperature sensing device 70 and the steel braided cover 62. Advantageously, the double stick tape is constructed of fiberglass to provide some thermal insulation for the tube 60. A thermal insulation layer 82 is then wrapped over the double stick tape 80. As illustrated, the thermal insulation layer 82 has a 50% overlap such that the thermal insulation layer 82 forms two complete layers over the double stick tape 80. Thermal insulation layer 82 may be applied without overlap such that only a single layer is present.

With thermal insulation layer 82 in place, five electrical leads 84, 86, 88, 90, 92 are helically wound around thermal insulation layer 82 and extend between connector 42 of wire harness 40 and connector 48 at the discharge end of hose 12. Electrical lead 84 is a ground wire which serves as a ground for the dispensing unit 16. Electrical leads 86, 88 are two leads which operatively couple heater 24 to a heating element (not shown) internally located in manifold 28. Similarly, electrical leads 90, 92 are two leads which operatively couple controller 22 to a temperature sensing device (not shown) internally located in manifold 28. Although electrical leads 84, 86, 88, 90, 92 are shown in FIG. 3 wrapped over thermal insulation layer 82, they could be wrapped under the thermal insulation layer 82.

Figure 4:
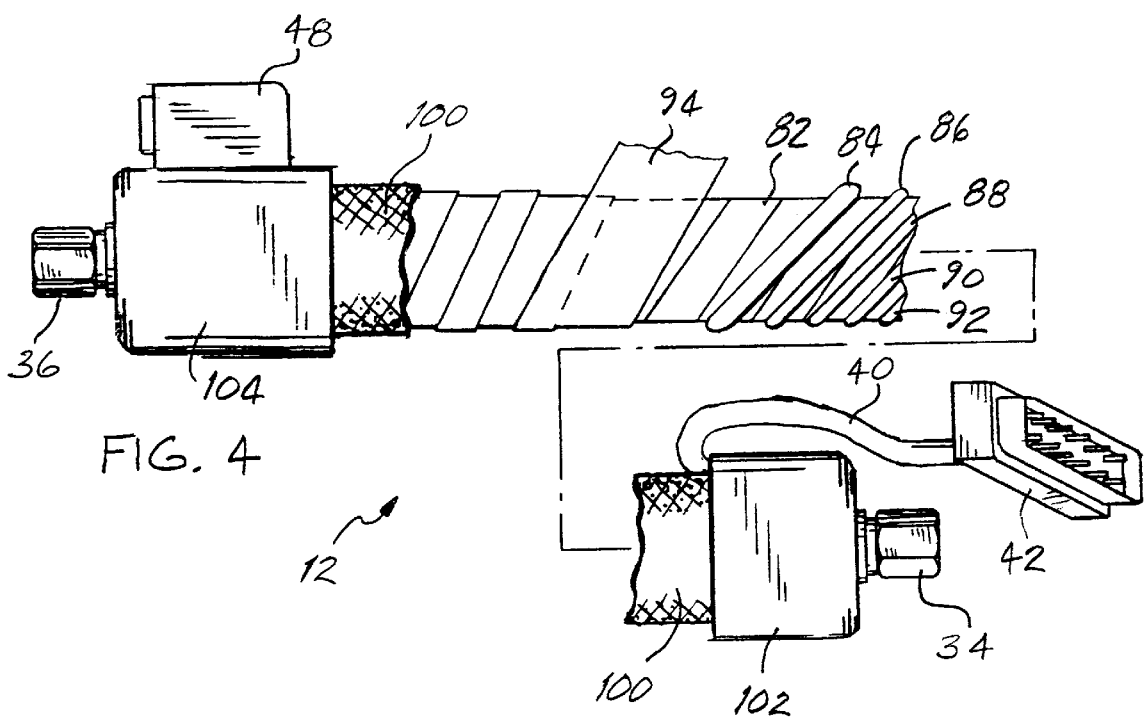
FIG. 4 is a side elevational view of still another section of the hose of FIG. 1 illustrating the final wrapping sequence during the manufacture of the hose.

With reference to FIG. 4, a layer of tape 94, such as electrical tape, is wrapped around the thermal insulation layer 82 and the electrical leads 84, 86, 88, 90, 92. A plastic braided cover 100 extends the entire length of the hose 12 to provide protection for the interior layers described above. Cuffs 102, 104 are placed over inlet end 34 and discharge end 36, respectively, to protect the interior layers from potentially damaging substances such as water.

While the present invention has been illustrated by a description of various preferred embodiments and while these embodiments have been described in considerable detail in order to describe the best mode of practicing the invention, it is not the intention of applicant to restrict or in any way limit the scope of the appended claims to such detail. Additional advantages and modifications within the spirit and scope of the invention will readily appear to those skilled in the art. The invention itself should only be defined by the appended claims.

I claim:

1. A hose for carrying heated liquid, said hose comprising:
   a tube for carrying liquid therethrough;
   a reinforcing layer encasing said tube and having an outer surface;
   a heater wire having an inner core contacted in surrounding relation by a protective casing, said heater wire being wound around said reinforcing layer such that said protective casing is in direct contact with said outer surface of said reinforcing layer; and
   a thermal insulation layer disposed around said heater wire and said reinforcing layer.

2. The hose of claim 1, wherein said protective casing is made of a self-lubricating polymer selected from the group consisting of polytetraflouroethylene (PTFE), polyamides, polyethene, and ultrahigh-molecular-weight polyethylene (UHWMPE).

3. The hose of claim 2, wherein said reinforcing layer is a metallic braiding.

4. The hose of claim 3, wherein said metallic braiding is made from stainless steel.

5. The hose of claim 3, wherein said tube is made from polytetraflouroethylene.

6. The hose of claim 1, wherein said protective casing contains an acetal.

7. A hose for carrying heated liquid, said hose comprising:
   a tube for carrying liquid therethrough;
   a metallic braided cover encasing said tube, said metallic braided cover having an outer surface;
   a heater wire having an inner core contacted in surrounding relation by a protective casing, said heater wire being wound around said metallic braided cover such that said protective casing is in direct contact with said outer surface of said metallic braided cover, said protective casing including a self-lubricating polymer; and
   a thermal insulation layer disposed around said heater wire and said metallic braided cover.

8. The hose of claim 7, wherein said metallic braided cover is made from stainless steel.

9. The hose of claim 7, wherein said tube is formed with polytetraflouroethylene.

10. The hose of claim 7, further comprising:
    a temperature sensing device wound around said metallic braided cover to sense the temperature of the liquid flowing through said tube.

11. The hose of claim 10, wherein said protective casing is made a self-lubricating polymer from the group consisting of polytetraflouroethylene (PTFE), polyamides, polyethene, and ultrahigh-molecular-weight polyethylene (UHWMPE).

12. The hose of claim 7, wherein said protective casing contains an acetal.

13. A hose for carrying a heated liquid, said hose comprising:
    a tube comprising polytetraflouroeythlene (PTFE) for carrying liquid therethrough under pressure;
    a stainless steel braided cover encasing said tube, said stainless steel braided cover having an outer surface;
    a heater wire having an inner core contacted in surrounding relation by a protective coating, said heater wire being wound around said stainless steel braided cover such that said protective coating is in direct contact with said outer surface of said stainless steel braided cover, said protective coating being made from polytetraflouroethylene; and
    a thermal insulation layer disposed around said heater wire and said stainless steel braided cover.

* * * * *